United States Patent
Watanabe et al.

(10) Patent No.: US 10,535,150 B2
(45) Date of Patent: Jan. 14, 2020

(54) TEXTURE EVALUATION SYSTEM

(71) Applicant: MAZDA MOTOR CORPORATION, Hiroshima (JP)

(72) Inventors: Masayuki Watanabe, Hiroshima (JP); Naokazu Goda, Okazaki (JP); Hidehiko Komatsu, Okazaki (JP); Nanae Michida, Hiroshima (JP); Atsuhide Kishi, Hiroshima (JP); Kazuo Nishikawa, Hiroshima (JP); Takahide Nouzawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 166 days.

(21) Appl. No.: 15/618,222

(22) Filed: Jun. 9, 2017

(65) Prior Publication Data

US 2017/0358097 A1    Dec. 14, 2017

(30) Foreign Application Priority Data

Jun. 14, 2016 (JP) ................. 2016-117656

(51) Int. Cl.
| | |
|---|---|
| *G06K 9/00* | (2006.01) |
| *G06T 7/49* | (2017.01) |
| *G06T 7/11* | (2017.01) |
| *G06T 7/73* | (2017.01) |
| *G06T 7/149* | (2017.01) |

(Continued)

(52) U.S. Cl.
CPC ............ *G06T 7/49* (2017.01); *G06K 9/00832* (2013.01); *G06K 9/4652* (2013.01); *G06K 9/4661* (2013.01); *G06K 9/4676* (2013.01); *G06T 7/11* (2017.01); *G06T 7/149* (2017.01); *G06T 7/174* (2017.01); *G06T 7/73* (2017.01); *G06T 7/90* (2017.01); *G06K 2009/487* (2013.01); *G06T 2207/10024* (2013.01); *G06T 2207/20221* (2013.01); *G06T 2207/30268* (2013.01)

(58) Field of Classification Search
None
See application file for complete search history.

(56) References Cited

U.S. PATENT DOCUMENTS

2005/0024361 A1 * 2/2005 Ikeda ................. G06K 9/48
 345/441
2005/0163373 A1 * 7/2005 Lee ................. G06K 9/0014
 382/173

(Continued)

FOREIGN PATENT DOCUMENTS

| | | |
|---|---|---|
| JP | 2005-260725 A | 9/2005 |
| JP | 2006-254107 A | 9/2006 |

*Primary Examiner* — Atiba O Fitzpatrick
(74) *Attorney, Agent, or Firm* — Studebaker & Brackett PC

(57) ABSTRACT

The present disclosure attempts to evaluate how the texture of an object is perceived based on visual features of the topological skeleton of the object. A camera S1 obtains a color image by taking an image of an object, which serves as an evaluation target. Within the image obtained, a visual feature area, which is likely to strike a person's eye when the person claps his/her eyes on the object, and an intensity of a visual stimulus of each pixel of the visual feature area are extracted. Visual skeleton features of each pixel of the image are determined within a contour region which is composed of the visual feature areas extracted. The visual skeleton features determined are shown on a display.

16 Claims, 16 Drawing Sheets

Medial axis ⇒ SKELETON

TRACE ALONG CENTERS OF CIRCLES INSCRIBED AT TWO OR MORE POINTS

(51) Int. Cl.
  G06T 7/174   (2017.01)
  G06T 7/90    (2017.01)
  G06K 9/46    (2006.01)
  *G06K 9/48*      (2006.01)

(56)  References Cited

U.S. PATENT DOCUMENTS

2010/0002908 A1*  1/2010  Miyamoto ................ B60R 1/00
                                                       382/103
  2014/0016843 A1*  1/2014  Zhang ................ G06K 9/00147
                                                       382/129
  2017/0008521 A1*  1/2017  Braunstein ............. G01C 21/32
  2017/0116765 A1*  4/2017  Chamaret ............. G06T 11/001
  2017/0177938 A1*  6/2017  Papanikolopoulos .......................
                                                     G06K 9/00657
  2017/0178402 A1*  6/2017  Chen ........................ G06T 19/20

* cited by examiner

Medial axis ⇒ SKELETON

TRACE ALONG CENTERS OF
CIRCLES INSCRIBED AT TWO OR
MORE POINTS

DRIVER COMPONENT (DRIVER FOCUS)

(PASSENGER'S SEAT FOCUS)

HUMAN COMPONENT (VEHICLE FOCUS)

(HUMAN FOCUS)

TEXTURE EVALUATION SYSTEM

CROSS-REFERENCE TO RELATED APPLICATION

This application claims priority to Japanese Patent Application No. 2016-117656 filed on Jun. 14, 2016, the entire disclosure of which is incorporated by reference herein.

BACKGROUND

The present disclosure relates to a texture evaluation system.

Texture evaluation is employed in various fields. Japanese Unexamined Patent Publication No. 2006-254107 discloses an image evaluation device which evaluates the quality of an image taken with a digital camera based on a positional relationship, intensity values, and intensity differences in a filmed object. Japanese Unexamined Patent Publication No. 2005-260725 discloses a device which evaluates the quality of a printed surface based on intensity distribution in a printed object.

SUMMARY

In evaluating a texture of an object, both, a topographic skeleton, which is obtained from contours of the object, and a surface of the object, play an important role. However, while the known art has placed great importance on evaluating textures of surfaces, little attention has been paid to texture evaluation from the viewpoint of topological skeletons.

With the above in mind, the present disclosure attempts to provide a texture evaluation system which is capable of evaluating how an object is perceived based on visual features of the topological skeleton of the object.

The present disclosure proposes the following solution. According to a first aspect of the disclosure, this solution is a texture evaluation system including:

an imager for obtaining a color image by taking an image of an object which serves as an evaluation target;

a visual feature area extractor extracting, within the image obtained by the imager, a visual feature area, which is likely to strike a person's eye when the person claps his/her eyes on the object, and an intensity of a visual stimulus of a pixel of the visual feature area;

a visual skeleton feature determiner for determining visual skeleton features of the pixel of the image with regard to a contour region which is composed of a plurality of visual feature areas extracted by the visual feature point extracting area; and a display displaying the visual skeleton features determined by the visual skeleton feature determiner.

The above solution allows for evaluating, based on a topological skeleton (medial axis), the texture of a contour which is shaped by visual feature areas indicating portions likely to strike a person's eye the moment the person claps his/her eyes on them, by displaying a skeleton structure of the contour in a manner in which the visual skeleton features—which indicate a degree of salience—are distributed.

Beneficial embodiments of the above solution are described in a second and further aspects of the disclosure. Kinds of visual feature areas may include at least intensity, chrominance, and orientation (second aspect of the disclosure). Intensity, chrominance, and orientation are features likely to strike a person's eye the moment the person claps his/her eyes on them. Therefore, including these factors as visual feature areas is beneficial for performing a high-level texture evaluation.

The visual feature area extractor may break down the image into a plurality of images for each of the kinds of the visual feature areas, extract visual feature areas from each of the images, and integrate the visual feature areas extracted from each of the images into one single image (third aspect of the disclosure). In this embodiment, an image which precisely reflects the visual skeleton features with respect to intensity, chrominance, and orientation respectively can be obtained. This configuration is beneficial inasmuch as it allows for performing a high-level texture evaluation.

The visual skeleton feature determiner may set, for each pixel of the image, a plurality of annular portions which are defined by a plurality of circles having different diameters and centering about each of the pixels, may determine an intensity of a visual stimulus within each of the annular portions by calculating an intensity of a visual stimulus of each of the pixels included in each of the annular portions, and may determine visual skeleton features for each of the pixels based on the intensity of the visual stimulus within each of the annular portions (fourth aspect of the disclosure). This embodiment is beneficial inasmuch as the visual skeleton features included in each of the pixels can be determined precisely while adding surrounding visual skeleton features and effectively eliminating influence of noise.

The visual skeleton feature determiner may finally determine the visual skeleton features of each of the pixels by a gradual addition of the intensity of the visual stimulus within an inner annular portion to the intensity of the visual stimulus within an outer annular portion. In the gradual addition, a first sum is defined as "$Dmn_{K+1}$," a previous sum as "$Dmn_K$," an intensity of a visual stimulus within an annular portion added first as "$Smn_K$," and a parameter as "v" (1>v>0). Then, the first sum "$Dmn_{K+1}$" is calculated based on Equation (2) where "mn" are coordinates of a center of the annular portion, and "$_K$" is a suffix (fifth aspect of the disclosure). This embodiment proposes a concrete calculation method for determining the visual skeleton features of each pixel.

Equation (2)

$$Dmn_{K+1} = Smn_K + \frac{Dmn_K}{1 + vSmn_K} \qquad (2)$$

The visual skeleton feature determiner may determine a peak position of the visual skeleton features (sixth aspect of the disclosure). This embodiment is beneficial inasmuch as a texture is evaluated based on the peak position of the visual skeleton features.

The visual skeleton feature determiner may determine a principal component of the visual skeleton features (seventh aspect of the disclosure). This embodiment is beneficial inasmuch as a texture is evaluated based on the principal component of the visual skeleton features.

The visual skeleton feature determiner may determine both a peak position and a principal component of the visual skeleton features (eighth aspect of the disclosure). This embodiment is beneficial inasmuch as a texture can be precisely evaluated based on both the peak position and the principal component of the visual skeleton features.

The object serving as evaluation target may be an interior component of a vehicle (ninth aspect of the disclosure). This embodiment is beneficial inasmuch as the texture of the interior component of a vehicle can be precisely evaluated using both the peak position and the principal component of the visual skeleton features.

The present disclosure allows for evaluating how the texture of an object is perceived based on visual features of the topological skeleton of the object.

DETAILED DESCRIPTION

Embodiments of the present disclosure will be described in detail after having explained the term "medial axis" which refers to a skeleton of a contour. Note that in the following description the "medial axis" is also referred to as a "topological skeleton" (i.e., "contour skeleton").

When a human evaluates the texture of an object (i.e., the aesthetic or beauty of the object), he or she perceives, in addition to the texture of a surface of the object, the medial axis—i.e., the topological skeleton—of the object. Thus, the medial axis plays a crucial role in texture evaluation. As well as visual feature points, the topological skeleton and its surroundings have a high degree of visual perceptibility, and are therefore likely to be perceived subconsciously (i.e., the human eye is likely to focus on the topological skeleton of an object).

Figure 1:
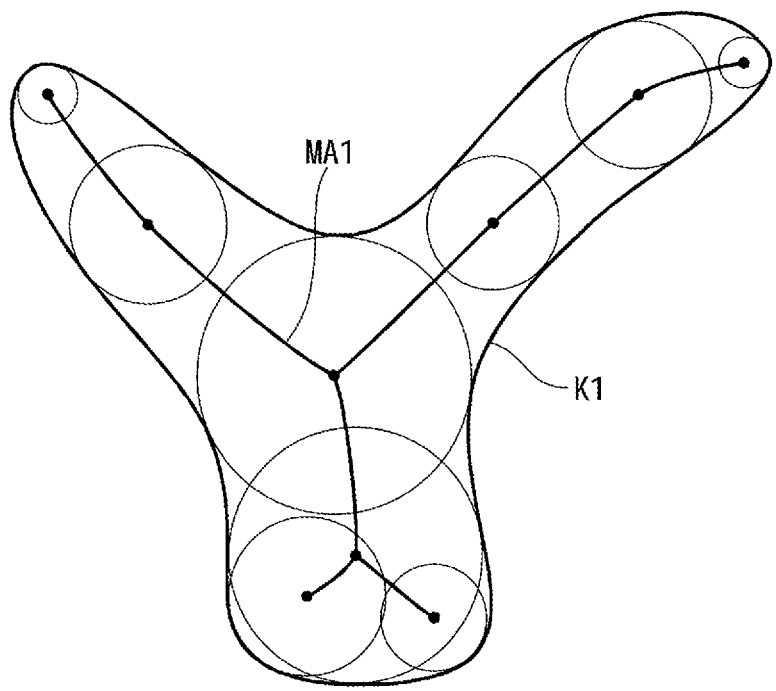
FIG. 1 illustrates an example topological skeleton.
Figure 2:
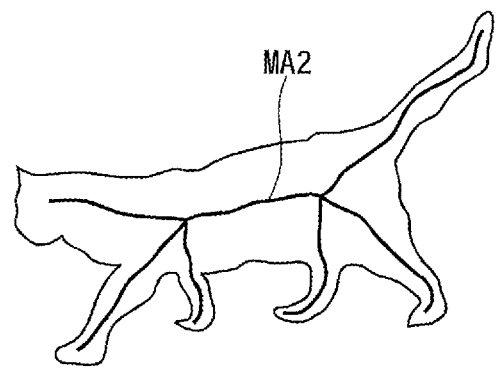
FIG. 2 illustrates an example topological skeleton.
Figure 3:
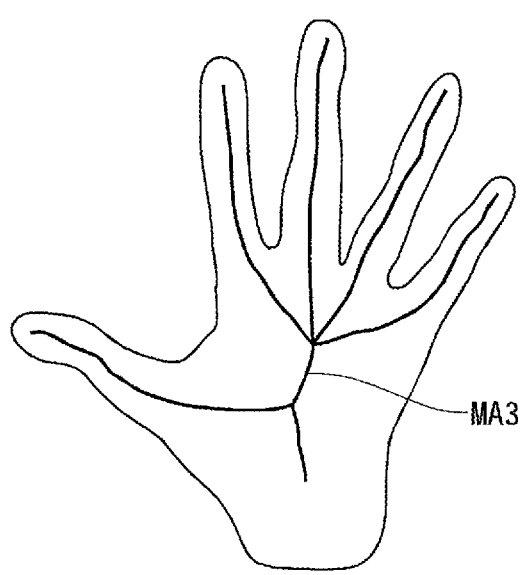
FIG. 3 illustrates an example topological skeleton.

FIG. 1 shows a contour K1 including a plurality of visual feature points, which are combined with each other and form an area easy for a human to perceive visually. A topological skeleton (medial axis) MA1 of the contour K1 is obtained by determining circles which inscribe the contour K1 at two or more tangent points, and by connecting center points of these circles into a linear shape. In other words, it can be said that the contour K1 is recognized by recognizing the contour of MA1. FIG. 2 illustrates the topological skeleton of a cat viewed from the side. This topological skeleton is referred to as MA2. FIG. 3 illustrates the topological skeleton of a human hand. This topological skeleton is referred to as MA3.

Figure 4:
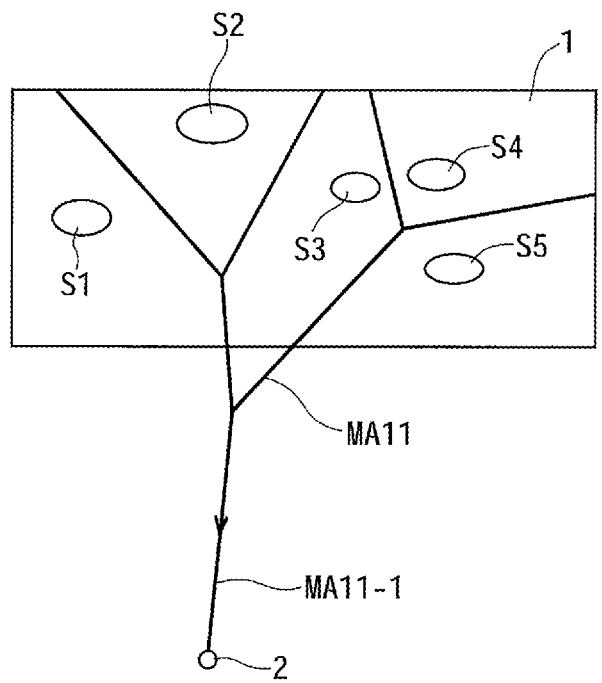
FIG. 4 illustrates an example topological skeleton.

Details regarding the topological skeleton (medial axis) of an object will be explained in detail with reference to FIGS. 4 to 6. In a simplified manner, FIG. 4 shows the contours of an actually existing temple complex with a rock garden from a bird's eye view. In the drawing, the reference character 1 indicates the rock garden, while the reference character 2 indicates a specific location in a space (butsuma) which occupies a Buddhist altar. A corridor leads to the butsuma which faces the rock garden 1. In the rock garden 1, five large rocks S1 to S5, which serve as visual feature points, are arranged in a bed of pebbles (gravel). The topological skeleton of the arrangement shown in FIG. 4 is indicated with the reference character MA11. Within the area of the rock garden 1, the topological skeleton MA11 has a plurality of branches. The topological skeleton MA11 centers about one topological skeleton branch MA11-1 and leads toward a specific location 2. It is assumed that the best spot for viewing the rock garden 1 is a spot on, or in the vicinity of, the topological skeleton branch MA11-1, which leads toward the specific location 2. As can be understood from the above, the topological skeleton of an object is a highly important factor when it comes to visual perception of beauty.

Figure 5:
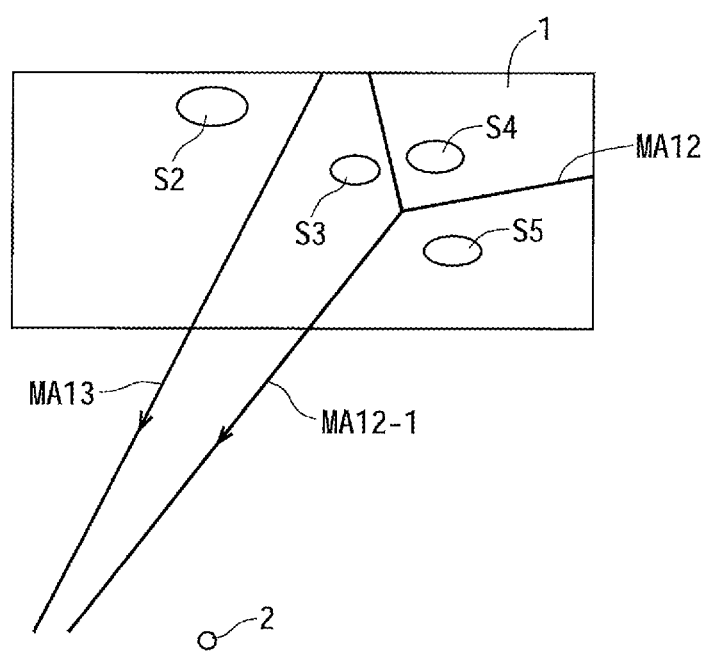
FIG. 5 illustrates how the topological skeleton of FIG. 4 changes when one large rock is removed.
Figure 6:
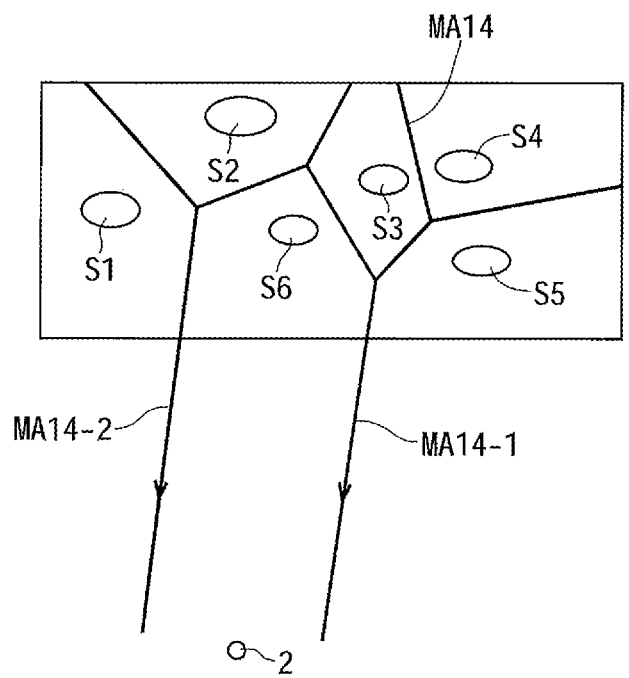
FIG. 6 illustrates how the topological skeleton of FIG. 4 changes when one large rock is added.

FIG. 5 illustrates the topological skeleton of FIG. 4 in a state after one large rock S1 has been removed. This topological skeleton is identified with the reference characters MA12 and MA13. In the case illustrated in FIG. 5, the topological skeleton is divided into two branches leading toward the specific location 2: a topological skeleton branch MA12-1 and a topological skeleton MA13. FIG. 6 illustrates the topological skeleton of FIG. 4 in a state after one large rock S6 has been added. This topological skeleton is identified with the reference character MA14. In the case illustrated in FIG. 6, the topological skeleton MA14 has two branches leading toward the specific location 2: MA14-1 and MA14-2. The topological skeleton in the case illustrated in FIG. 5 does not directly lead toward the butsuma. The topological skeleton in the case illustrated in FIG. 6 leads somewhat toward the butsuma, but is shifted as compared to the topological skeleton illustrated in FIG. 4. Note that FIGS. 4 to 6 are not meant to illustrate how differences between the topological skeletons influence the beauty of a rock garden. These drawings are merely meant to illustrate how the topological skeleton alters when the large rocks (S1 to S6), which serve as visual feature points, are positioned differently.

Figure 7:
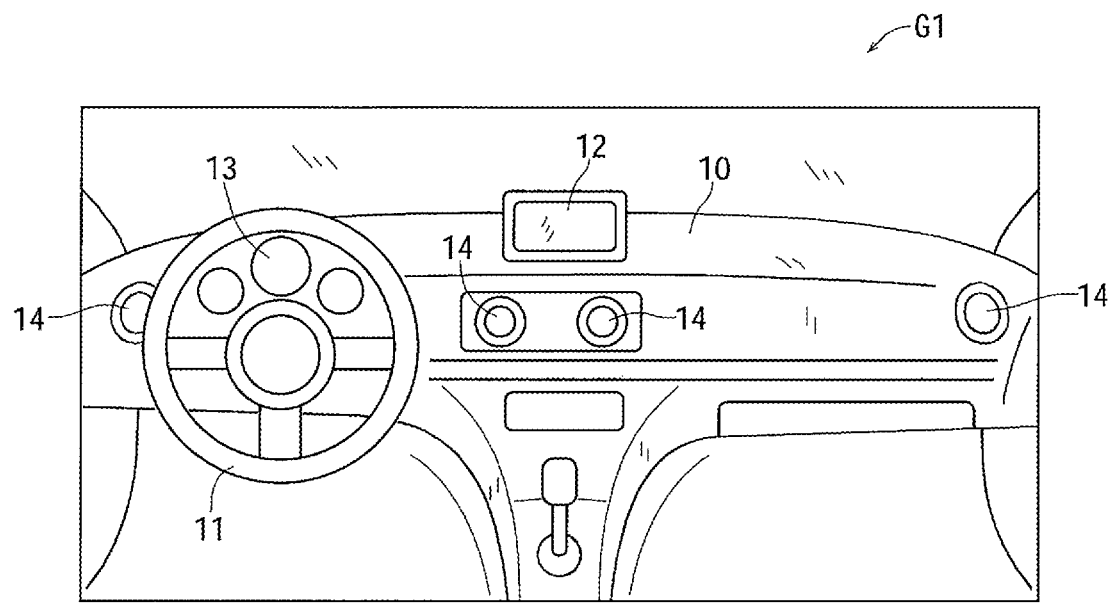
FIG. 7 illustrates an image taken of a dashboard of a vehicle.
Figure 8:
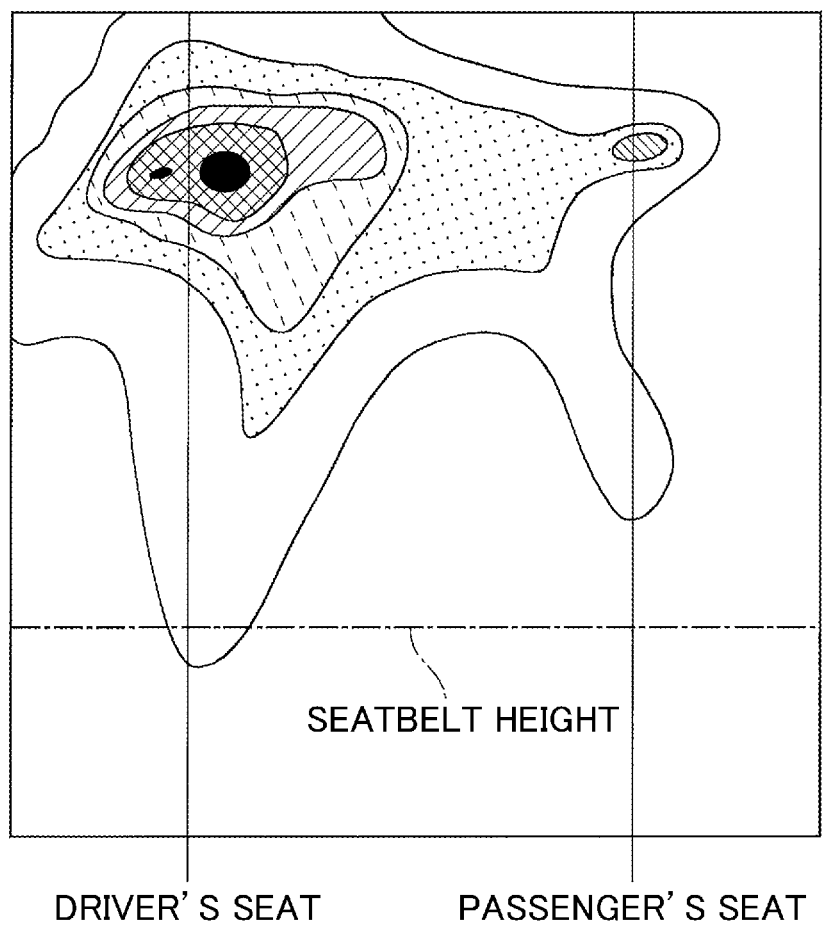
FIG. 8 is a map illustrating a distribution of visual skeleton features obtained based on the image of FIG. 7.
Figure 9:
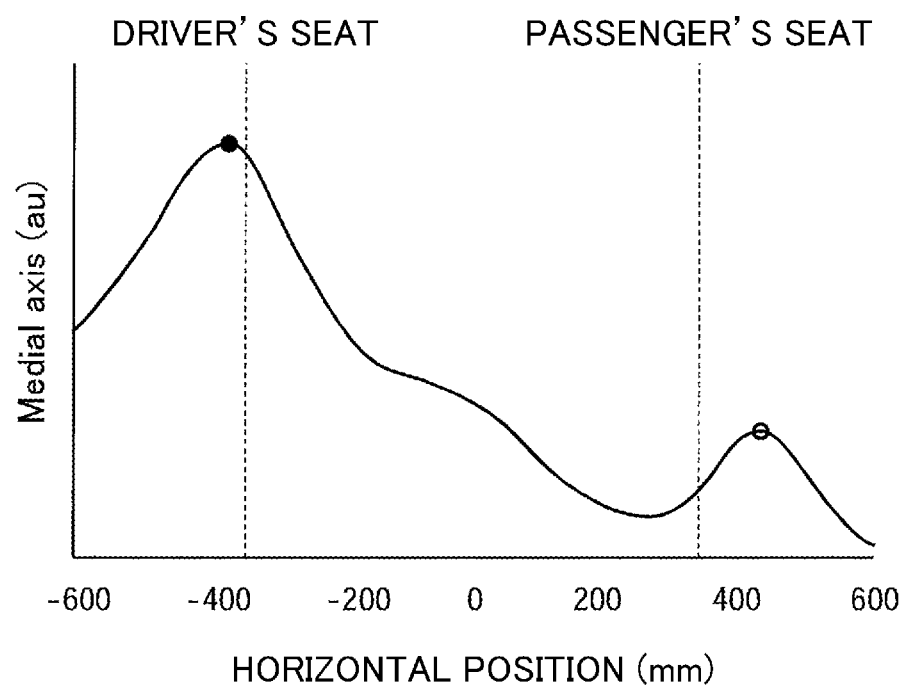
FIG. 9 illustrates a distribution of visual skeleton features at a predetermined height position extracted from the map of FIG. 8.

With reference to FIGS. 7 to 9, it will now be explained how the design of a dashboard (an interior component) of a vehicle—in this case a car—influences a viewer. FIG. 7 illustrates an image G1 taken of a dashboard of a vehicle which actually exists. In the image G1, the instrument panel is denoted with the reference character 10. Components installed in the dashboard 10 include, inter alia, a steering wheel 11, a display 12, an instrument panel 13, and air conditioning vents 14. The image G1 illustrated in FIG. 7 has been taken from a center position in a width direction of the vehicle from behind the dashboard 10. A digital camera capable of taking color images has been used as an imaging device.

A corrected image, in which salient features are extracted from the image G1 of FIG. 7, is obtained as will be described later. Based on this corrected image, features which indicate the degree of salience are calculated and mapped, as shown in FIG. 8. The term "salient feature" refers to a portion (or region) likely to strike a person's eye when the person claps his/her eyes on it. In this embodiment, such portions or regions are specified based on intensity, chrominance (contrast), and orientation, which serve as parameters. Note that the term "orientation" indicates an edge direction of portions other than substantially irregular portions of an object's circumference.

In the image G1 shown in FIG. 7, salient features (likely to be perceived at first glance) include the chrominance, size, and contour of the dashboard 10. Further included are the steering wheel 11 (which is a protruding object in itself and includes decorative metallic portions of a high degree of intensity), the display 12 (which is a protruding object with a high degree of intensity), and the air conditioning vents 14 (which have a specific contour and include decorative metallic portions provided at their circumferential rims).

By obtaining a topological skeleton of the contour (which is a virtual contour) formed by the salient features, visual skeleton features as those shown in FIG. 8 are obtained. Note that hereinafter in both, the description and the drawings, the term "visual skeleton features" is also simply referred to as "features." In FIG. 8, the blackened region indicates the most visible portion (i.e., a portion with a large amount of visual skeleton features). The regions with a cross-hatch pattern, hatch pattern, dashed hatch pattern, dot pattern, and the region without pattern indicate, in this order, less and less visible portions (portions with a small amount of visual skeleton features).

Based on the visual skeleton features illustrated in FIG. 8, FIG. 9 shows visual skeleton features at a seatbelt height spread over an entire width of the vehicle. The term "horizontal position" in FIG. 9 indicates a position in a width direction of the vehicle. The horizontal position "0" is the center position in the width direction of the vehicle. The term "driver's seat" indicates a lateral center position of the driver's seat, while the term "passenger's seat" indicates a lateral center position of the passenger's seat. Further, in FIG. 8, the term "seatbelt height" indicates an altitudinal position of the seatbelt. (More specifically, it is a position where a seatbelt anchor is installed in the vicinity of a passenger's shoulder, i.e., a position at a height which is approximately the height of the passenger's eyes.)

In FIG. 9, the visual skeleton features have two peak points (peak positions), which indicate salience: one in front of the driver's seat and one in front of the passenger's seat at a position away from the center portion of the dashboard in the width direction of the vehicle. In front of the driver's seat, however, there are more visual skeleton features than at any other position. It can thus be evaluated that, in FIG. 9, the design of the dashboard and its surroundings focuses on the driver. This means that the dashboard has a high degree of salience when viewing it from the driver's seat.

Judging from FIG. 9, it is possible to largely increase the amount of visual skeleton features in front of the passenger's seat by adding, e.g., a metallic decorative element, which expands in the width direction of the vehicle, in the region of the dashboard right in front of the passenger's seat. Contrariwise, it is possible to reduce the amount of visual skeleton features in front of the driver's seat by removing, e.g., a salient metallic decorative element from the instrument panel in front of the driver's seat, or a metallic decorative element attached to the steering wheel. Furthermore, it is possible to increase the amount of visual skeleton features around the center portion in the width direction of the vehicle by installing elements like, e.g., a car stereo device or an air conditioner control panel, which are provided at the center portion of the dashboard in the width direction of the vehicle, at a more salient position.

In the following, a virtual contour which includes a plurality of visual feature points is envisaged. The virtual contour is a contour encircling the visual feature points, and has an outer rim which connects portions in which the strength of a visual stimulus within a relatively small range within the image is equal to or higher than a predetermined value. In or around a visual topological skeleton of the virtual contour, the degree of visual perception is high. A person is likely to subconsciously cast his/her eyes on the visual topological skeleton (i.e., a person's view is guided toward the visual topological skeleton). Consequently, it is beneficial to keep the concept of visual topological skeletons in mind when designing an object. For example, it is beneficial for a switch frequently operated to be positioned on or near a topological skeleton. Contrariwise, it is beneficial for a switch rarely operated or an object to be kept out of sight to be positioned remote from a visual topological skeleton.

Figure 10:
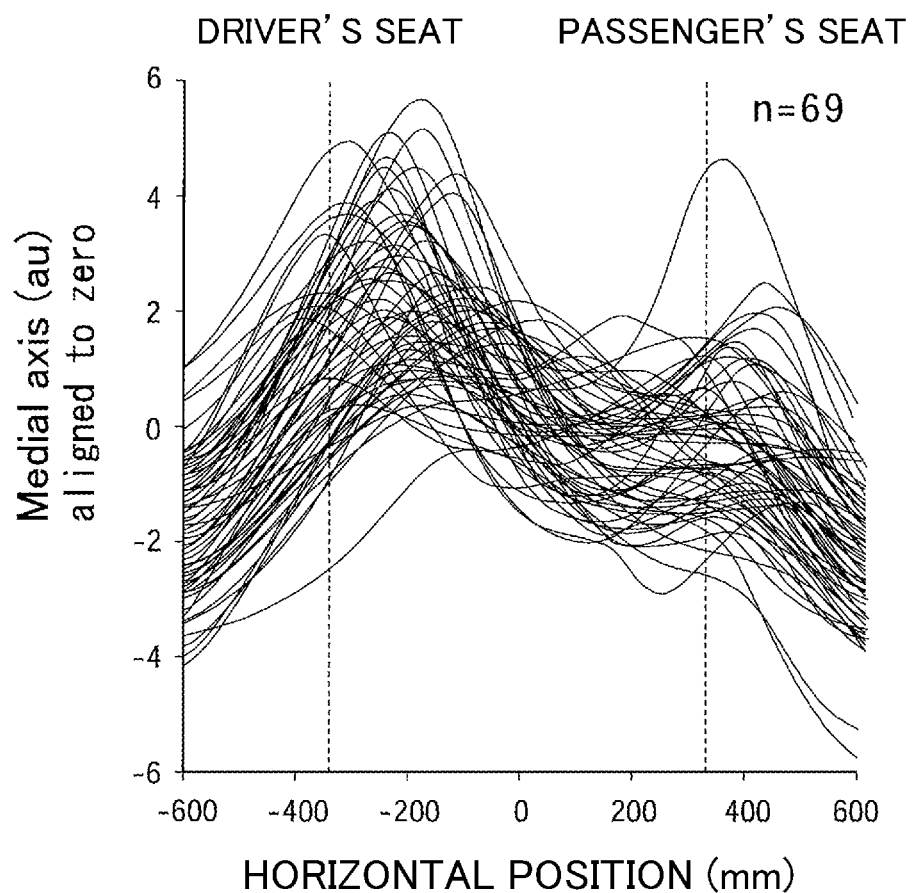
FIG. 10 corresponds to FIG. 9 and illustrates a distribution of visual skeleton features of dashboards of a plurality of vehicles.
Figure 11:
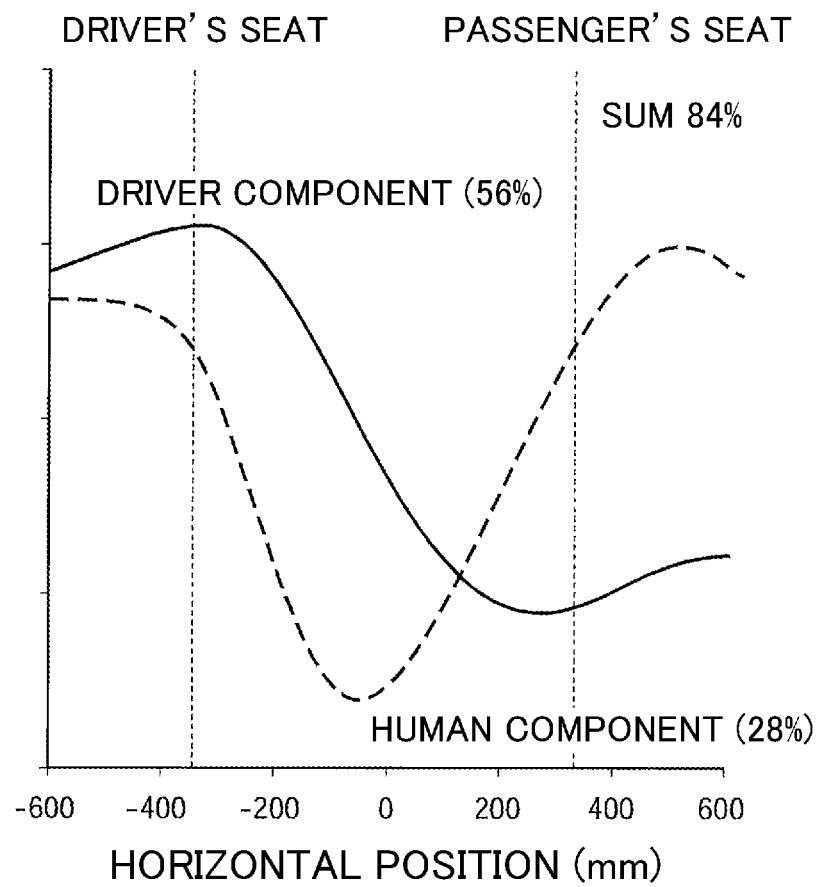
FIG. 11 illustrates results of a principal component analysis of the distribution of the visual skeleton features in the dashboards of the plurality of vehicles.

FIG. 10 shows results of having obtained visual skeleton features corresponding to those of FIG. 9 for a plurality of vehicles (cars)—which are actually commercially available—by taking images of these vehicles like the image shown in FIG. 7. FIG. 11 illustrates results of a principal component analysis of the results obtained in FIG. 10. These results show that many vehicles are designed with a focus on the driver ("driver focus"). This means that the amount of visual skeleton features in front of the driver's seat is extremely high, whereas the amount visual skeleton features in front of the passenger's seat is low. Further the results show that many vehicles are designed with a so-called "human focus." This means that the amount of visual skeleton features in front of the driver's seat is approximately as high as that in front of the passenger's seat, while the amount of visual skeleton features at the center portion of the dashboard in the width direction of the vehicle is low.

Figure 12A:
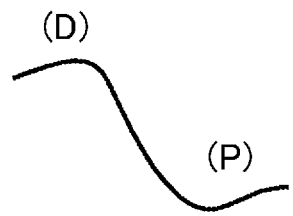
FIGS. 12A and 12B illustrate characteristics of a driver focus and a passenger's seat focus which define a driver component.
Figure 12B:
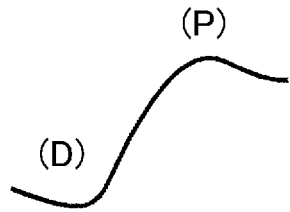

In order to evaluate a level of prioritization between the driver and the front-seat passenger in the design of a dashboard when it comes to the amount of visual skeleton features, the term "passenger's seat focus" is introduced in addition to the above-mentioned term "driver focus." The driver focus and the passenger's seat focus indicate a "driver component." More specifically, FIG. 12A shows how visual skeleton features are distributed when a dashboard is designed with a driver focus (corresponding to the solid line in FIG. 11). FIG. 12B shows how the visual skeleton features are distributed when a dashboard is designed with a passenger's seat focus (i.e., contrary to design with driver focus, most visual skeleton features can be found in front of the passenger's seat, whereas the amount of visual skeleton features in front of the driver's seat is small).

Figure 13A:
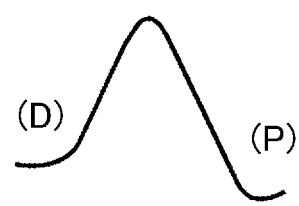
FIGS. 13A and 13B illustrate features of a human focus and a vehicle focus which define a human component.
Figure 13B:
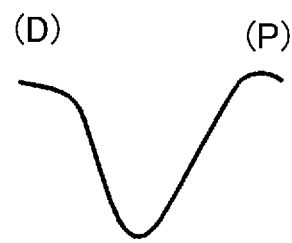

In order to evaluate the level of prioritization between the human and the vehicle in the design of the dashboard, the term "human component" is introduced. The human component is indicated by the above-mentioned human focus (passenger focus) and a so-called "vehicle focus." FIG. 13B shows how the visual skeleton features are distributed when a dashboard is designed with a human focus. This distribution corresponds to that indicated by the dashed line in FIG. 11. FIG. 13A shows how the visual skeleton features are distributed when a dashboard is designed with a vehicle focus. Other than in design with a human focus, here, the amount of visual skeleton features in front of both the driver's seat and the passenger's seat is low, whereas the amount of visual skeleton features between the seats—i.e., in the center portion of the dashboard—is high.

Figure 14:
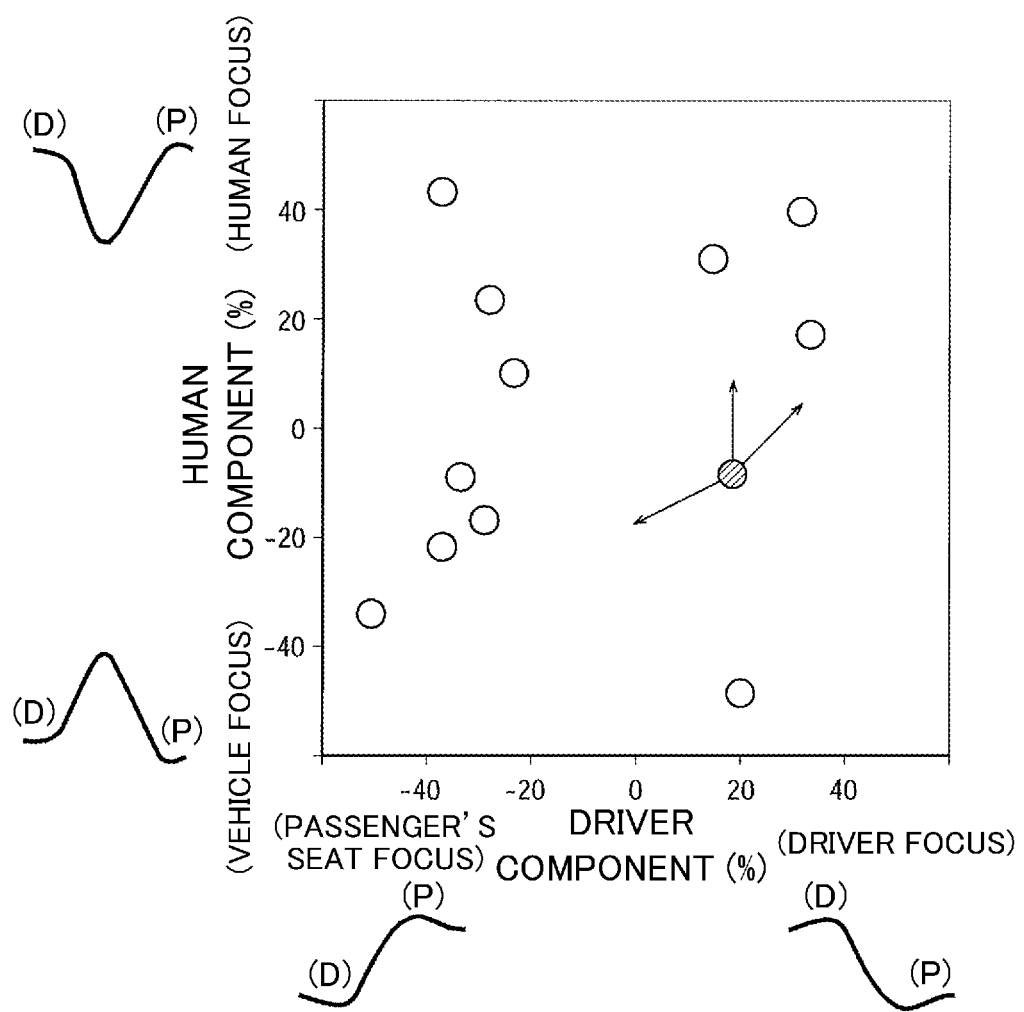
FIG. 14 illustrates positioning of the dashboards in the plurality of vehicles in a characteristic diagram in which the driver component and the human component serve as parameters.

Actual visual skeleton features do not solely belong to one single category among the "driver focus," "passenger's seat focus," "vehicle focus," and "human focus" but to all of these categories to different degrees. FIG. 14 uses the categories "driver focus," "passenger's seat focus," "vehicle focus," and "human focus" as parameters to map characteristics of the dashboards of actual vehicles. The circles in FIG. 14 indicate the actual vehicles. Among these vehicles, the characteristics of the one indicated with the hatched circle can be altered, e.g., in the directions indicated by the arrows by altering salient features of the dashboard of this vehicle.

FIG. 14 shows a correlation between the "driver focus," the "passenger's seat focus," the "vehicle focus," and the "human focus." Alternatively, however, characteristics can be obtained by showing the correlation between the "driver focus" and the "passenger's seat focus" only, or the correlation between the "vehicle focus" and the "human focus" only.

The characteristics based on the visual skeleton features obtained in the present disclosure do not evaluate how good or bad the dashboards of the vehicles look (degree of beauty). Instead, these characteristics indicate, in a physical (objective) sense, how the visual skeleton features influence a person's visual perception of the dashboard. Consequently, it is beneficial to develop (or alter) the design of a vehicle like a sports car, in which the focus beneficially lies on the driver and the vehicle, such that—in a feature map like the one shown in FIG. 14—the vehicle has a strong driver focus and a strong vehicle focus. Contrariwise, it is beneficial to develop (or alter) the design of a vehicle like a family car, in which less importance is placed on the driver and the vehicle, such that the vehicle as a strong passenger's seat focus and a strong human focus. In any case, an objective understanding of the characteristics of the visual skeleton features, which are based on salient features, is very useful in developing and altering design.

Figure 15:
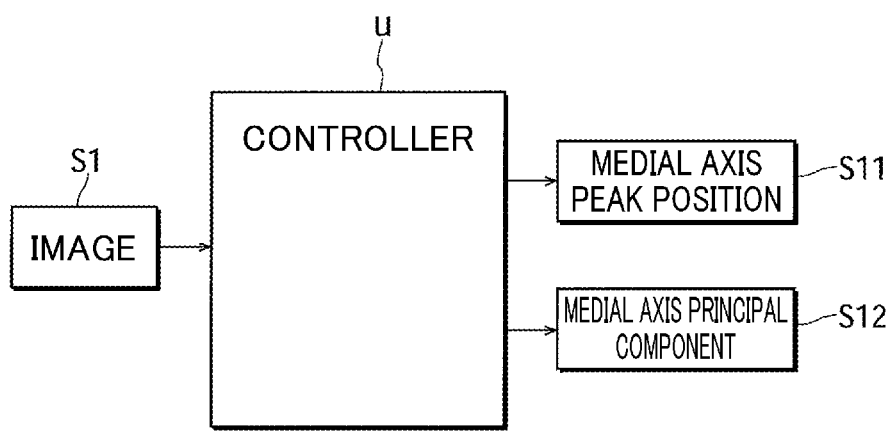
FIG. 15 illustrates an example control system according to the present disclosure.

Next an example control system for obtaining visual skeleton features like those shown in FIG. 9 will be explained. In FIG. 15, the reference character U indicates a controller which employs a microcomputer (in this embodiment, a commercially available PC is employed). An image (corresponding to the image G1 of FIG. 7) taken with a digital camera S1, which is capable of taking color images, is input into the controller U. Based on the image input, the controller U outputs two kinds of characteristics, and shows them on a display. The characteristics output are defined as a characteristic S11, which indicates a peak value of visual skeleton features, and a characteristic S12, which indicates a principal component.

Figure 16:
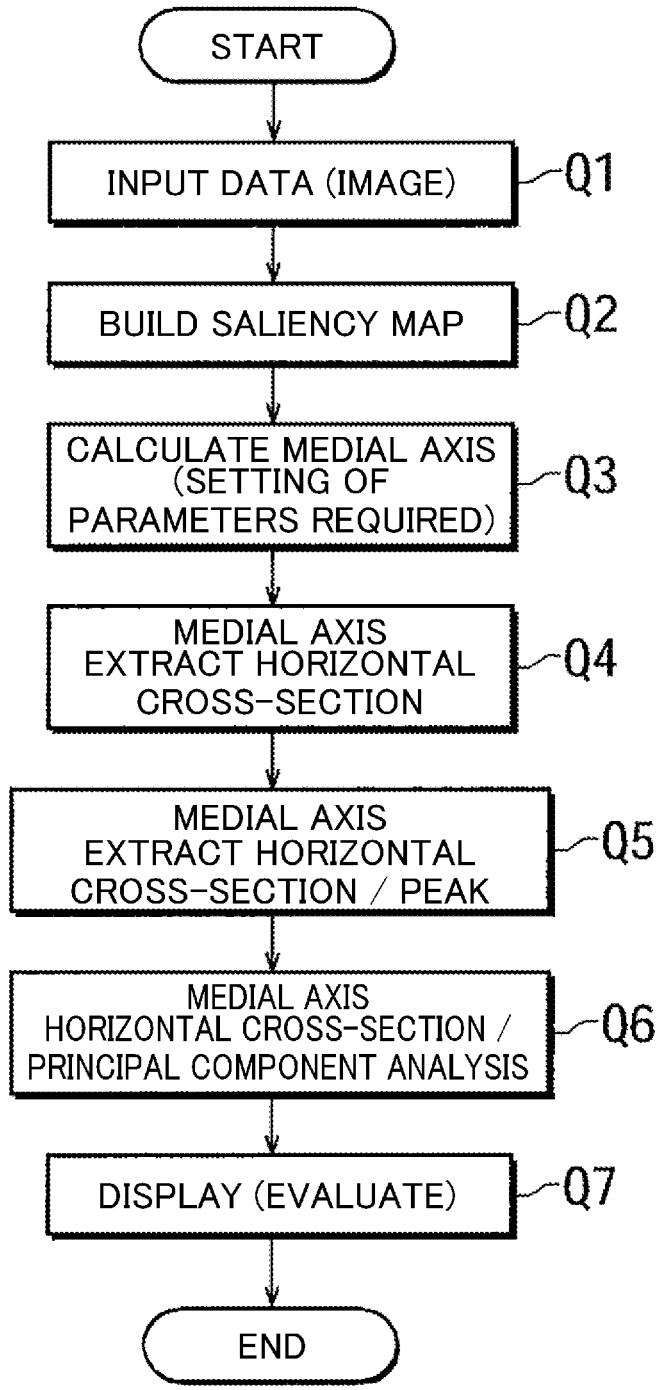
FIG. 16 is a flowchart illustrating a control example according to the present disclosure.

FIG. 16 illustrates what kind of control the controller U performs. In the following, the flowchart shown in FIG. 16 will be explained. The reference character Q indicates steps.

First, in step Q1, an image (a color image like the one shown in FIG. 7) is input into the controller U. Then, in step Q2, a saliency map is built, as will be described later, based on the image input into the controller U. In step Q3, the saliency map built in step Q2 is used to calculate a topological skeleton (medial axis) (i.e., to obtain features like those shown in FIG. 8).

Next, in step Q4, a horizontal cross-section at a desired height (corresponding to the seatbelt height of FIG. 8) is extracted from the image. Subsequently, in step Q5, the peak (a peak value and its position) of the visual skeleton features is extracted. Then, in step Q6, a principal component analysis of the horizontal cross-section is performed. Finally, in step Q7, the peak (characteristic) extracted in step Q5 is output and displayed as a characteristic S11, and results of the analysis performed in step Q6 are output and displayed.

Figure 20:
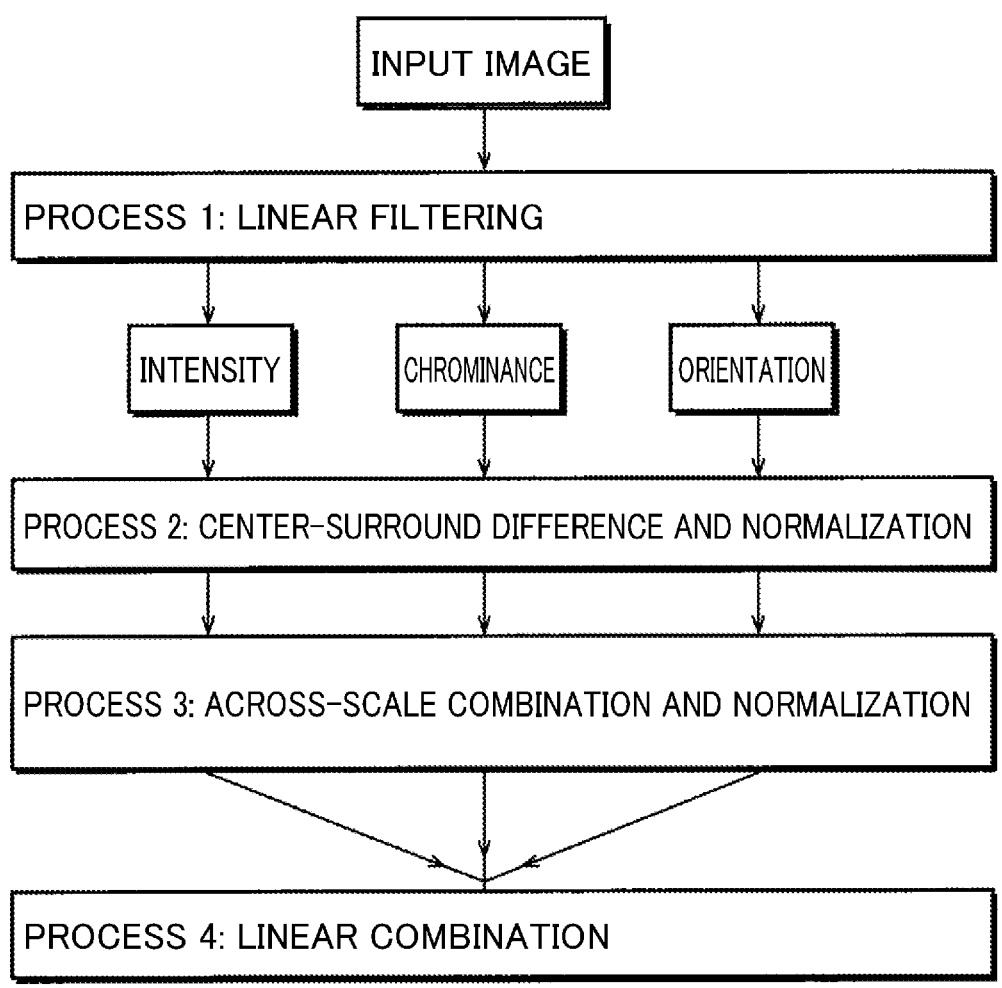
FIG. 20 illustrates a process for obtaining a map which summarizes visual skeleton features with respect to intensity, chrominance, and orientation respectively.

Next, an example method for building the saliency map of step Q2 shown in FIG. 16 (a map which—like the map illustrated in FIG. 8—shows the distribution of visual skeleton features) will be explained with reference to FIG. 20. First, process 1 is performed on the image G1 which is an image like the one shown in FIG. 7 taken with a digital camera S1. In the scope of process 1, the image G1 is divided by linear filtering into images of three categories: intensity, chrominance, and orientation. More specifically, in process 1, several scaled images whose resolution is gradually downscaled are produced based on the image (a RGB color image) input. Subsequently, each of three components—intensity, chrominance, and orientation—is sequentially extracted from each of the scaled images.

Following process 1, process 2 is performed. In process 2, in the scope of a pre-process, center-surround differences of each of the images divided into the three categories are computed to obtain three kinds of feature maps, and normalization performed. In process 2, the three kinds of feature maps are built using the difference of Gaussians, i.e., by subtracting a wide Gaussian distribution (smoothed image with a low resolution) from a narrow Gaussian distribution (smoothed image with a high resolution). (Maps in which features similar to Mexican hat functions are extracted are obtained.)

In process 2, the pre-process is followed by a post-process. In the scope of the post-process, maxima M of intensities of stimuli and mean values m of the maxima M are determined for each of the three kinds of feature maps built in the pre-process. For example, the following normalization process is performed. Values in each of the feature maps are normalized such that a fixed range from 0 to M is obtained. Next, in each of the feature maps, a position for extracting the maximum M is detected, all local maxima at positions other than the position of the maximum M are extracted, and a mean value m of the local maxima is determined. Then, all values in each of the feature maps are multiplied by $(M-m)^2$ to build new feature maps. In the three feature maps obtained this way, positions of pixels are indicated by X- and Y-coordinates, while intensities of visual stimuli are indicated on a Z-axis.

Subsequently, in process 3, the three feature maps built in process 2, which have different scales, are linearly combined and normalized. That is, regarding each of the maps, a linear sum is extracted for each of the features (intensity, chrominance, orientation) to build conspicuous maps. Further, the conspicuous maps for each of the features are subjected to a process similar to the post-process.

Then, in process 4, the linear sum is calculated to obtain one map (saliency map) which integrates the three kinds of feature maps. That is, after having summed up the conspicuous maps of each of the three features obtained in process 3, one scale map (saliency map) is built by multiplying the sum of the conspicuous maps by one third.

Note that the salient features in this embodiment are defined as the three features intensity, chrominance, and orientation. Therefore, in the process illustrated in FIG. 20, the image is divided into images for each of these three features before being processed. Alternatively, however, the salient features may be defined as four or more features. In this case, the image would be divided into four or more images before being processed in the same manner. Processing the image by dividing it into images for each salient feature allows for obtaining the intensity of the visual stimulus for each salient feature with a high degree of precision. Of course it is also conceivable to perform image processing without dividing the image into images for the different salient features. In this case, however, depending on the salient feature in question, it may be difficult to sufficiently reflect the intensity of its visual stimulus.

Next, with reference to FIG. 19, it will be explained how the visual skeleton features of each image element (pixel) are calculated based on the saliency map built. The example shown in FIG. 19 relates to a method which allows for eliminating noise from pixels in the process of extracting the topological skeleton.

Figure 19:
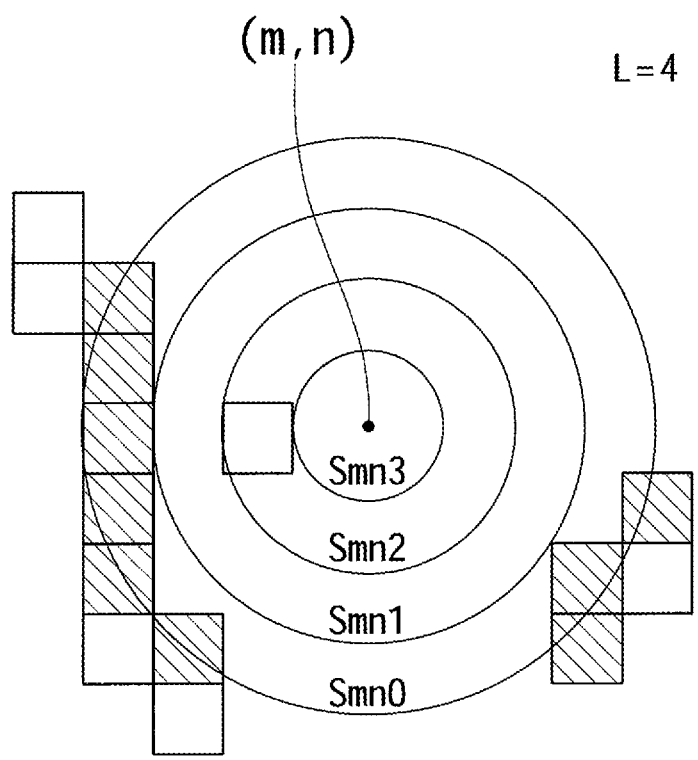
FIG. 19 illustrates how visual skeleton features are determined for each of a plurality of annular portions.

In FIG. 19, if a pixel (with the coordinates m, n) inscribes another pixel, which has an intensity of a visual stimulus of equal to or higher than a predetermined value, at two or more points, circles 11 to 14 which have diameters differing from each other by the size of one pixel are arranged with their centers around this pixel. Spaces between the circles 11 to 14 are annular. In the case shown in FIG. 19, a total number L of these annular portions is four. Sums of the intensities of the visual stimuli within each of the annular portions are indicated by the reference characters $Smn_0$ to $Smn_3$. $Smn_0$ to $Smn_3$ are summations of intensities of visual stimuli equal to or higher than a predetermined value, the visual stimuli being included in pixels and located within the annular portion. That is, as shown in Equation (1) below, each of the annular portions $Smn_0$ to $Smn_3$ is calculated. Note that in Equation (1), Cxy is the intensity of the visual stimulus of one pixel with the coordinates (x, y).

Equation (1)

$$Smn_{L-\ell} = \sum_{x,y,\ell} Cxy \tag{1}$$

A summation $Dmn_L$ of the intensities of the visual stimuli within each of the annular portions which have been calculated as $Smn_0$ to $Smn_3$, is calculated while added values are regulated by a parameter v (1>v>0). Concretely, the summation of the intensities of the visual stimuli within an outer annular portion is a value attenuated (decreased) by the parameter v with respect to the summation of the intensities of the visual stimuli within an inner annular portion. That is, based on the following Equation (2), $Dmn_{K+1}$ is calculated as a first sum. Note that the previous sum is $Dmn_K$, and that a summation of the annular portion which is added first is $Smn_K$, where K is a suffix.

Equation (2)

$$Dmn_{K+1} = Smn_K + \frac{Dmn_K}{1 + vSmn_K} \tag{2}$$

As shown in Equation (3), after having used Equation (2) to calculate the added values of all annular portions, the summation $Dmn_L$ equals visual skeleton features HSTmn of each of the pixels.

Equation (3)

$$HSTmn = Dmn_L \tag{3}$$

As can be seen from Equation (2), the first sum $Dmn_{K+1}$ is basically calculated by adding the first added value $Smn_K$ to the previous sum $Dmn_K$. However, the previous sum $Dmn_K$ is a value which decreases along with a value resulting from multiplying the first added value $Smn_K$ by the parameter v. That is, the higher the first added value $Smn_K$ is, the smaller a reflection degree of the previous sum $Dmn_K$ at which the first sum $Dmn_{K+1}$ is calculated becomes.

If the parameter v is a value close to zero (e.g., 0.001), the degree at which the summation $Smn_K$ within each of the annular portions is reflected becomes excessively high. As a result, it becomes difficult to identify a difference between visual skeleton features on a map. Contrariwise, if the parameter v is a value close to one (e.g., 0.5), the difference between the visual skeleton features becomes excessively big. As a result, it becomes difficult to identify an overall distribution of the visual skeleton features. For comparison, by setting the parameter v to approximately 0.01, the visual skeleton features are distributed at a moderate differentiation on the map, and characteristics like those shown, e.g., in FIG. 8 can be obtained. As can be seen from the above description, the parameter v is appropriately set (selected) in accordance with an object of analysis.

Figure 17:
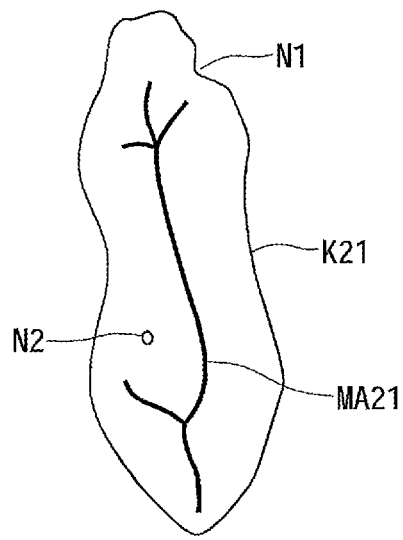
FIG. 17 illustrates a topological skeleton extracted from a contour, which includes noises, only by means of inscribed circles.
Figure 18:
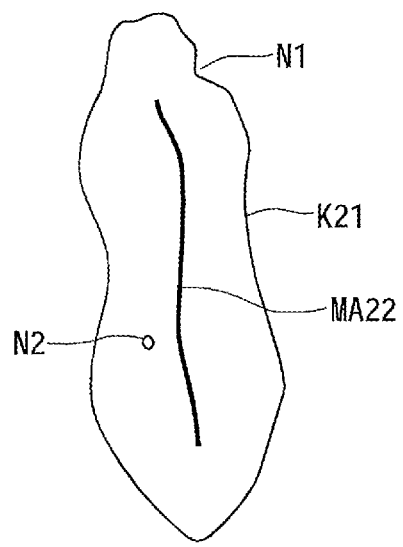
FIG. 18 illustrates a topological skeleton extracted from the contour, which includes the noises, by means of visual skeleton features in a plurality of annular portions, each concentric around each of a plurality of pixels.

Advantages of the above described method for calculating the visual skeleton features included in each of the pixels will be explained with reference to FIGS. 17 and 18. FIGS. 17 and 18 show a contour K21 envisaged based on salient features. The contour K21 has a boundary noise N1, which has the shape of a notch, and a small internal noise N2, which has the shape of a circle. If a topological skeleton is built in the manner described with reference to FIG. 1 by connecting centers of circles inscribing the contour K21 at two or more points, the noises N1 and N2 are included in the topological skeleton. The thus obtained topological skeleton MA21 includes branches in a lower and in an upper portion of the contour K21. As a result, the contour K21 fails to be indicated accurately by the topological skeleton MA21.

Using, however, the method shown in FIG. 19 and Equations (1) to (3), a topological skeleton MA22 which does not have branches in the lower and upper portions of the contour K21 can be obtained, as shown in FIG. 18. As a result, the contour K21 is indicated accurately by the topological skeleton MA22.

The present disclosure is not limited to the above-explained embodiments. In the scope of the present disclosure, appropriate changes and modifications may be made. The present disclosure is not limited to the texture evaluation of a dashboard of a vehicle, and may be employed for texture evaluation of, e.g., a variety of surfaces inside a vehicle viewed from various perspectives by obtaining characteristics as those shown in FIG. 9. Moreover, for example, when a person opens a driver side door of a vehicle to get into the vehicle, a driver's seat, an end of the dashboard at the driver's side, a center console, and an inner portion of a passenger side door are in the visual field of the person. When the inner portion of the passenger side door has a small amount of visual skeleton features whereas the driver's seat has a large amount of visual skeleton features, the person's eyes are likely to be directed to the driver's side. Such a design does not invite the person to get further into the vehicle. Poor in visual stimuli deep inside the vehicle, this design has a driver focus and is beneficial for a sports car. Contrariwise, when the inner portion of the passenger side door has a large amount of visual skeleton features whereas the driver's seat has a small amount of visual skeleton features, the person's eyes are likely to be directed to the inner portion of the passenger side door. Such a design invites the person to get further into the car. Rich in visual stimuli deep inside the vehicle, this design is beneficial for a family car. Of course, the present disclosure is not limited to evaluating the interior of vehicles, and can also be employed in designing the outward appearance of a vehicle.

The present disclosure is not limited to vehicles. It can be employed in a similar manner when it comes to furniture in stores or other interior spaces. For example, the evaluation system according to the present disclosure can be used in designing a store to create an eye-catching entrance which attracts attention of people passing by. Further, a wall surface near the entrance may be specifically devised to direct the eyes of customers who have entered the store toward seats the customers are supposed to be guided to. For example, a display may be installed on the wall surface, and the direction the customers are guided in may be changed appropriately by adjusting contents displayed. Moreover, the present disclosure can be used, e.g., in designing a bathroom, to test in which direction (toward which position) the eyes of a person standing in the entrance of the bathroom and looking inside are directed, and to develop (or alter) the design of the bathroom in order to direct the eyes of the person in a desired direction. The above being mere examples, the evaluation system according to the present disclosure can be used to precisely develop and alter various kinds of design. Furthermore, the characteristics of the visual skeleton features finally output are not limited to the peak position and the principal component. Depending on, e.g., the kind of evaluation target, either one can be output. Of course, the present disclosure is not limited to what is specified in this description (namely, the evaluation of targets). The present disclosure also implicitly includes helping to provide such targets with a substantially beneficial or advantageous design.

The present disclosure allows for performing an objective evaluation of the visual perception of objects. Such an evaluation can be used to enhance the degree of visual perception, and is beneficial for precisely developing and altering the design of a wide range of objects.

What is claimed is:

1. A texture evaluation system comprising:
an imager obtaining a color image by taking an image of an object which serves as an evaluation target;
a visual feature area extractor extracting, within the image obtained by the imager, a visual feature area including salient features, and an intensity of a visual stimulus of a pixel of the visual feature area;
a visual skeleton feature determiner determining visual skeleton features of the pixel of the image with regard to a contour region which is composed of a plurality of visual feature areas extracted by the visual feature area extractor; and
a display displaying the visual skeleton features determined by the visual skeleton feature determiner, wherein
the visual skeleton feature determiner sets, for each pixel of the image, a plurality of annular portions which are defined by a plurality of circles having different diameters and centering about each of the pixels, determines an intensity of a visual stimulus within each of the annular portions by calculating an intensity of a visual stimulus of each of the pixels included in each of the annular portions, and determines visual skeleton features for each of the pixels based on the intensity of the visual stimulus within each of the annular portions.

2. A texture evaluation system comprising:
an imager obtaining a color image by taking an image of an object which serves as an evaluation target;
a visual feature area extractor extracting, within the image obtained by the imager, a visual feature area including salient features, and an intensity of a visual stimulus of a pixel of the visual feature area;
a visual skeleton feature determiner determining visual skeleton features of the pixel of the image with regard to a contour region which is composed of a plurality of visual feature areas extracted by the visual feature area extractor; and
a display displaying the visual skeleton features determined by the visual skeleton feature determiner, wherein
kinds of the visual feature areas include at least intensity, chrominance, and orientation, and
the visual skeleton feature determiner sets, for each pixel of the image, a plurality of annular portions which are defined by a plurality of circles having different diameters and centering about each of the pixels, determines an intensity of a visual stimulus within each of the annular portions by calculating an intensity of a visual stimulus of each of the pixels included in each of the annular portions, and determines visual skeleton features for each of the pixels based on the intensity of the visual stimulus within each of the annular portions.

3. A texture evaluation system comprising:
an imager obtaining a color image by taking an image of an object which serves as an evaluation target;
a visual feature area extractor extracting, within the image obtained by the imager, a visual feature area including salient features, and an intensity of a visual stimulus of a pixel of the visual feature area;
a visual skeleton feature determiner determining visual skeleton features of the pixel of the image with regard to a contour region which is composed of a plurality of visual feature areas extracted by the visual feature area extractor; and
a display displaying the visual skeleton features determined by the visual skeleton feature determiner, wherein
kinds of the visual feature areas include at least intensity, chrominance, and orientation,
the visual feature area extractor breaks down the image into a plurality of images for each of the kinds of the visual feature areas, extracts visual feature areas from each of the images, and integrates the visual feature areas extracted from each of the images into one single image, and
the visual skeleton feature determiner sets, for each pixel of the image, a plurality of annular portions which are defined by a plurality of circles having different diameters and centering about each of the pixels, determines an intensity of a visual stimulus within each of the annular portions by calculating an intensity of a visual stimulus of each of the pixels included in each of the annular portions, and determines visual skeleton features for each of the pixels based on the intensity of the visual stimulus within each of the annular portions.

4. The system of claim 1, wherein
the visual skeleton feature determiner finally determines the visual skeleton features of each of the pixels by a gradual addition of the intensity of the visual stimulus within an inner annular portion to the intensity of the visual stimulus within an outer annular portion, and
in the gradual addition, a first sum is defined as "$Dmn_{K+1}$," a previous sum as "$Dmn_K$," an intensity of a visual stimulus within an annular portion added first as "$Smn_K$," and a parameter as "v" (1>v>0), and then the first sum "$Dmn_{K+1}$" is calculated based on Equation (2) where "mn" are coordinates of a center of the annular portion, and "$_K$" is a suffix Equation (2)

$$Dmn_{K+1} = Smn_K + \frac{Dmn_K}{1 + vSmn_K} \quad (2)$$

5. The system of claim 2, wherein
the visual skeleton feature determiner finally determines the visual skeleton features of each of the pixels by a gradual addition of the intensity of the visual stimulus within an inner annular portion to the intensity of the visual stimulus within an outer annular portion, and
in the gradual addition, a first sum is defined as "$Dmn_{K+1}$," a previous sum as "$Dmn_K$," an intensity of a visual stimulus within an annular portion added first as "$Smn_K$," and a parameter as "v" (1>v>0), and then the first sum "$Dmn_{K+1}$" is calculated based on Equation (2) where "mn" are coordinates of a center of the annular portion, and "$_K$" is a suffix Equation (2)

$$Dmn_{K+1} = Smn_K + \frac{Dmn_K}{1 + vSmn_K} \quad (2)$$

6. The system of claim 3, wherein
the visual skeleton feature determiner finally determines the visual skeleton features of each of the pixels by a gradual addition of the intensity of the visual stimulus within an inner annular portion to the intensity of the visual stimulus within an outer annular portion, and
in the gradual addition, a first sum is defined as "$Dmn_{K+1}$," a previous sum as "$Dmn_K$," an intensity of a visual stimulus within an annular portion added first as "$Smn_K$," and a parameter as "v" (1>v>0), and then the first sum "$Dmn_{K+1}$" is calculated based on Equation (2) where "mn" are coordinates of a center of the annular portion, and "K" is a suffix Equation (2)

$$Dmn_{K+1} = Smn_K + \frac{Dmn_K}{1 + vSmn_K} \quad (2)$$

7. The system of claim 1, wherein
the visual skeleton feature determiner determines a peak position of the visual skeleton features.

8. The system of claim 1, wherein
the visual skeleton feature determiner determines a principal component of the visual skeleton features.

9. The system of claim 1, wherein
the visual skeleton feature determiner determines both a peak position and a principal component of the visual skeleton features.

10. The system of claim 9, wherein
the object serving as the evaluation target is an interior component of a vehicle.

11. The system of claim 4, wherein
the visual skeleton feature determiner determines a peak position of the visual skeleton features.

12. The system of claim 4, wherein
the visual skeleton feature determiner determines a principal component of the visual skeleton features.

13. The system of claim 4, wherein
the visual skeleton feature determiner determines both a peak position and a principal component of the visual skeleton features.

14. The system of claim 13, wherein
the object serving as the evaluation target is an interior component of a vehicle.

15. The system of claim 2, wherein
the visual skeleton feature determiner determines a peak position of the visual skeleton features.

16. The system of claim 2, wherein
the visual skeleton feature determiner determines a principal component of the visual skeleton features.

* * * * *